United States Patent [19]

Kitagawa et al.

[11] Patent Number: 5,416,702
[45] Date of Patent: May 16, 1995

[54] VEHICLE ELECTRICAL-LOAD LIMITING APPARATUS

[75] Inventors: Masashi Kitagawa; Kenichiro Kimura, both of Wako, Japan

[73] Assignee: Honda Giken Kogyo Kabushiki Kaisha, Tokyo, Japan

[21] Appl. No.: 884,525

[22] Filed: May 15, 1992

[30] Foreign Application Priority Data

May 22, 1991 [JP] Japan .................. 3-117699

[51] Int. Cl.$^6$ ............................ B60L 1/08; H02J 7/00
[52] U.S. Cl. ................... 364/424.05; 364/493; 318/139; 315/80; 307/10.1; 180/65.3; 180/65.8
[58] Field of Search ............. 364/424.05, 493, 424.01; 180/65.1, 65.2, 65.3, 65.8; 318/139; 315/80; 307/10.1

[56] References Cited

U.S. PATENT DOCUMENTS

| | | | |
|---|---|---|---|
| 3,891,979 | 6/1975 | Braun et al. | 340/234 |
| 4,042,056 | 8/1977 | Horwinski | 180/65.1 |
| 4,222,450 | 9/1980 | Fobbs | 180/65.1 |
| 4,620,283 | 10/1986 | Butt et al. | 364/493 |
| 4,809,175 | 2/1989 | Hosaka et al. | 364/424.01 |
| 4,916,328 | 4/1990 | Culp, IV | 364/493 |
| 5,124,916 | 6/1992 | Tokoro et al. | 364/424.1 |
| 5,136,209 | 8/1992 | Benedict et al. | 315/80 |
| 5,150,045 | 9/1992 | Nagano et al. | 320/62 |
| 5,166,584 | 11/1992 | Fukino et al. | 318/139 |

FOREIGN PATENT DOCUMENTS 63-40135 3/1988 Japan .
63-61360 4/1988 Japan .

Primary Examiner—Kevin J. Teska
Assistant Examiner—Tyrone Walker
Attorney, Agent, or Firm—Lyon & Lyon

[57] ABSTRACT

A vehicle electrical-load limiting apparatus wherein the priority given over a plurality of electrical loads, for restricting the driving of the electrical loads mounted on a vehicle, is first decided in order of importance and the amount of drive restriction of each of the electrical loads is then determined based on the remaining capacity of a vehicle electric source, thereby restricting the driving of the electrical loads. A fuzzy inference is carried out by making use of membership functions corresponding to both (a) the deviation indicative of the difference between a standard value set for each electrical load attached to the vehicle and a value of an electrical load when now in use, and (b) the residual capacity of the electric source. Then, the amount of the drive restriction of each of the electrical loads is obtained from the result of the fuzzy inference. It is therefore possible to automatically determine to what degree the driving of the electrical loads should be restricted according to the degree of the residual capacity of the electric source.

17 Claims, 10 Drawing Sheets

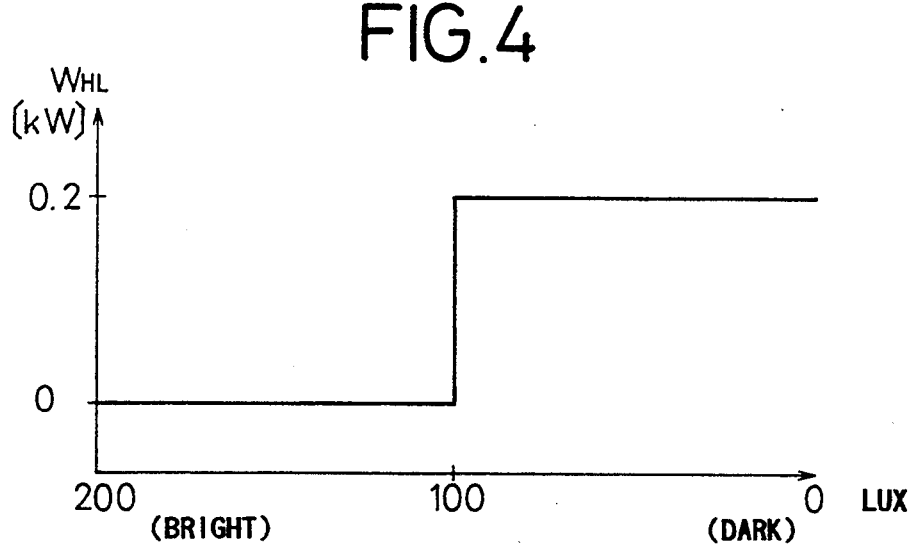
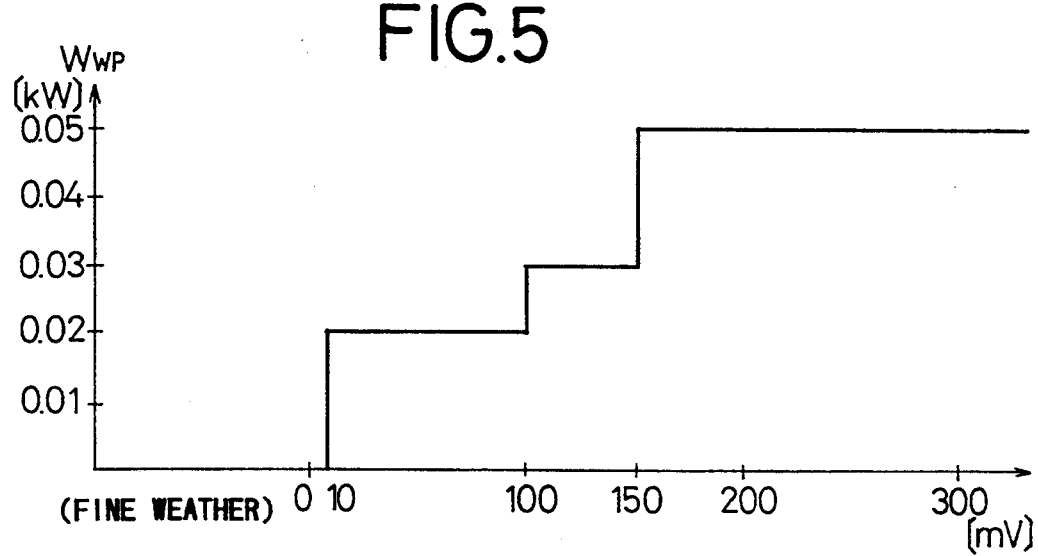

FIG.10(d)
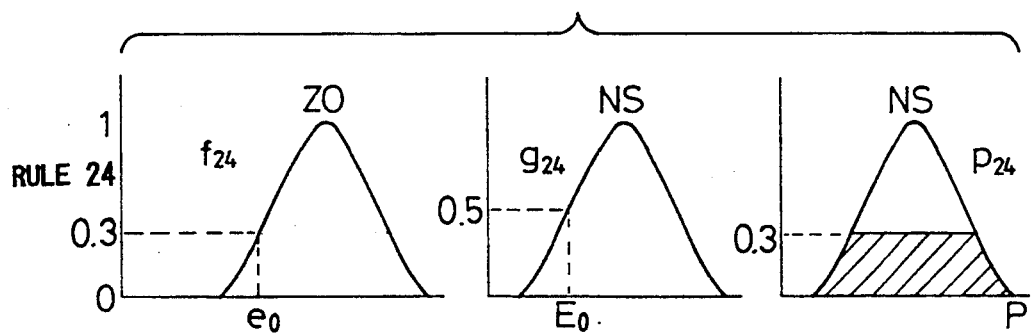
FIG.10(e)
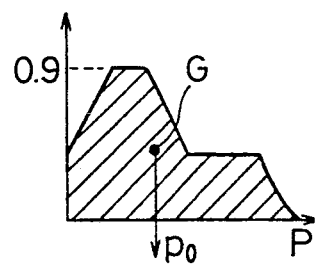

VEHICLE ELECTRICAL-LOAD LIMITING APPARATUS

BACKGROUND OF THE INVENTION

1. Field of the Invention

The present invention relates to a vehicle electrical-load limiting apparatus for restricting, as needed, the driving of each of a plurality of electrical loads which are employed in a vehicle having an electric source mounted thereon such as a battery whose residual capacity is reduced with the elapse of time or a generator which needs another driving energy, and particularly employed in an electric automobile free of an internal combustion engine serving as a power source for its running or a hybrid-type electric automobile.

2. Description of the Related Art

In an electric vehicle having an electric motor serving as a power source, for example, the running distance is influenced by the residual capacity of a battery serving as an electric source for driving the electric motor. Therefore, there has been a demand for a battery having a capacity which can be increased as much as possible under conditions required for the electric vehicle. However, a battery capable of sufficiently providing, at one charge level, a running speed and a travelling distance of the electric vehicle, which are not inferior to those of a conventional engine-driven type automobile, has not yet been put to practical use. Even when a generator is mounted on a vehicle, it is important to ensure electrical energy for stably driving the generator for a predetermined period of time or longer.

Therefore, a technique for restricting the use of electrical loads, i.e., various electrical equipment or components mounted on a vehicle, which are activated by electrical energy supplied from an electric source mounted on the vehicle, in accordance with the conditions of the electric source, has been proposed with a view toward making a coverable or running distance longer by using an electric source such as a battery whose capacity is restricted.

In order to prevent an electric vehicle or the like from being incapable of reaching an intended place or a location at which a battery can be charged or replaced with another when the residual capacity of the vehicle battery is reduced, for example, there has been known a technique for restricting the driving of electrical components which are less important to the vehicle (or its driver) (see Japanese Utility Model Application Laid-Open Nos. 63-40135, 63-61360, for example). According to the disclosed technique, the electrical components (electrical loads) mounted on the vehicle are classified according to their importance. Priority given over the electrical components, for restricting the driving of the electrical components for each classification is then determined, and the groups of the electrical components whose driving is restricted are determined depending on the remaining capacity of the electric source mounted on the vehicle.

In the above disclosure, however, the driving of the electrical components is limited by quantitative restriction rules referred to as the classifications determined depending on the values of the residual capacity of the electric source. Therefore, a change in the classification of the electrical components whose driving is restricted occurs even if the values of the remaining capacity of the electric source vary slightly, so that inconvenience, i.e., unsuitable electrical load control such as a restriction beyond need, etc. tends to develop in practice. In order to perform the electrical load control suitable to practical use, it is necessary to judge or determine to what degree the driving of the electrical components should be restricted depending on how much the remaining capacity of the electric source is present and to carry out a fine drive restriction based on the result of the determination. The above disclosure has, however, the problem that the above determination and the drive restriction have not been taken into consideration.

SUMMARY OF THE INVENTION

It is therefore an object of the present invention to provide a vehicle electrical-load limiting apparatus capable of determining to what degree the driving of electrical loads should be restricted according to the remaining capacity of an electric source and of providing a fine drive restriction based on the result of the determination.

It is another object of the present invention to provide an apparatus for deciding priority given over a plurality of electrical loads, for restricting the driving of the electrical loads mounted on a vehicle in order of importance and determining the amount of drive restriction of each of the electrical loads on the basis of the remaining capacity of an electric source mounted on the vehicle, thereby restricting the driving of each of the electrical loads, the apparatus comprising arithmetic means for setting membership functions corresponding to both of the deviation indicative of the difference between a standard value set for each of the electrical loads and the present value indicative of the state of the present electrical load and the remaining capacity of the electric source and executing a fuzzy inference using the membership functions, thereby determining the amount of drive restriction of each of the electrical loads from the result of the execution of the fuzzy inference.

It is a further object of the present invention to provide a vehicle electrical-load limiting apparatus wherein the arithmetic means automatically calculates a standard value in accordance with an environmental state to which the vehicle is subjected.

It is a still further object of the present invention to provide a vehicle electrical-load limiting apparatus wherein an arithmetic operation on the environmental state is performed based on a detected signal output from each of a luminance sensor, a moisture sensor, and a temperature sensor.

It is a still further object of the present invention to provide a vehicle electrical-load limiting apparatus wherein the vehicle is an electric automobile.

It is a still further object of the present invention to provide a vehicle electrical-load limiting apparatus wherein the vehicle is a hybrid-type automobile.

It is a still further object of the present invention to provide a vehicle electrical-load limiting apparatus wherein the arithmetic means comprises restriction priority setting means for setting the drive restriction priority of the plurality of electrical loads mounted on the vehicle in order of importance, restriction priority storing means for storing therein the set drive restriction priority of the plurality of electrical loads, electrical load detecting means for detecting one of the plurality of electrical loads, standard value arithmetic means for performing an arithmetic operation on a standard value of a desired electrical load based on the present value of the detected one electrical load, deviation arithmetic means for calculating the deviation indicative of the difference between the present value of the detected one electrical load and the calculated standard value of the desired electrical load, residual-capacity detecting means for detecting the remaining capacity of an electric source mounted on the vehicle, fuzzy inference arithmetic means for reading a membership function of the deviation and the residual capacity, which has previously been stored in membership function storing means on the basis of the calculated deviation and the detected residual capacity and performing an arithmetic operation on a fuzzy inference based on the read membership function, amount-of-drive-restriction arithmetic means for calculating the amount 0f the drive restriction of each of the electrical loads from the result of the arithmetic operation on the fuzzy inference, and electrical-load controlling means for reading the drive restriction priority stored in the restriction priority storing means based on the result of the arithmetic operation on the amount of the drive restriction and controlling each of the electrical loads in accordance with the drive restriction priority.

It is a still further object of the present invention to provide a vehicle electrical-load limiting apparatus wherein the electrical loads whose drive restriction priority is stored in the restriction priority storing means are divided into a first group unsuitable to the drive restriction of the electrical loads, a second group capable of adjusting the amount of the drive restriction of each of the electrical loads, a third group capable of adjusting the amount of the drive restriction of each of the electrical loads and providing economical use of the electrical loads in accordance with use environments of the vehicle, and a fourth group suitable to the drive restriction of the electrical loads and incapable of adjusting the amount of the drive restriction of each of the electrical loads.

It is a still further object of the present invention to provide a vehicle electrical-load limiting apparatus wherein the first group includes electrical loads such as a power steering and a running-motor controller or the like, which are indispensable to the running of the vehicle.

It is a still further object of the present invention to provide a vehicle electrical-load limiting apparatus wherein the second group includes electrical loads such as an air conditioner and a heater coil or the like, which are capable of restricting performance of the electrical loads by reducing electric power to be supplied.

It is a still further object of the present invention to provide a vehicle electrical-load limiting apparatus wherein the third group includes electrical loads capable of restricting their performance by reducing supply power, and economically avoiding unnecessary operations such as wiper driving at the time of stoppage of the vehicle and control of the turning on of a headlight at a bright location.

It is a still further object of the present invention to provide a vehicle electrical-load limiting apparatus wherein the fourth group includes electrical loads such as an interior light and a remocon (remote control) mirror or the like, which are incapable of adjusting the amount of the drive restriction of each of the electrical loads when they are subjected to a use limit.

It is a still further object of the present invention to provide a vehicle electrical-load limiting apparatus wherein the use environments of the vehicle include the weather, the brightness and darkness.

It is a still further object of the present invention to provide a vehicle electrical-load limiting apparatus wherein the electrical load detecting means is a detecting circuit for detecting the total dissipated power of various electrical components mounted on the vehicle.

It is a still further object of the present invention to provide a vehicle electrical-load limiting apparatus wherein the standard value arithmetic means performs an arithmetic operation on a standard value of each electrical load based on the final standard load value, the average value of normal electrical loads necessary for vehicle running and each of coefficients of electrical loads of the heater and the air conditioner, an electrical load of the headlight and an electrical load for driving the wipers.

It is a still further object of the present invention to provide a vehicle electrical-load limiting apparatus wherein the residual-capacity detecting means includes depth-of-discharge detector for detecting the depth of discharge of a vehicle driving battery and an arithmetic circuit for calculating the remaining capacity of the battery based on the detected depth of discharge.

It is a still further object of the present invention to provide a vehicle electrical-load limiting apparatus wherein the fuzzy inference arithmetic means has a membership function storing circuit for storing therein a membership function of the deviation and the residual capacity which have been set in advance.

It is a still further object of the present invention to provide a vehicle electrical-load limiting apparatus wherein the fuzzy inference arithmetic means is activated to divide a membership function relative to the residual capacity read from the membership function storing means into a plurality of fuzzy regions in accordance with the depth of the discharge.

It is a still further object of the present invention to provide a vehicle electrical-load limiting apparatus wherein the amount-of-drive-restriction arithmetic means performs an arithmetic operation on the amount of the drive restriction based on the similarity of factors relative to the deviation and the similarity of factors relative to the residual capacity.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 4 is an explanatory graph showing exemplary values of an electrical load of a headlight, which are used to set the standard load value by the vehicle electrical-load limiting apparatus;

FIG. 5 is an explanatory graph depicting exemplary values of a wiper driving load, which are used to set the standard load value by the vehicle electrical-load limiting apparatus;

FIGS. 10(a) through 10(e) are graphs for describing the results of the fuzzy inference with respect to respective fuzzy control rules.

DETAILED DESCRIPTION OF THE PREFERRED EMBODIMENTS

Figure 1:
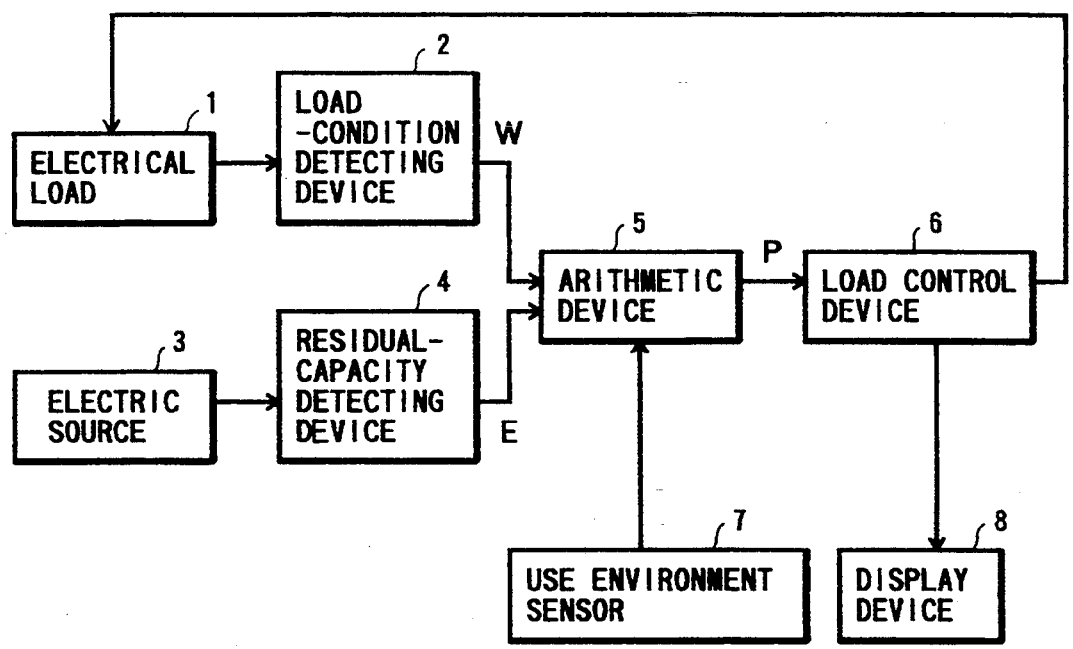
FIG. 1 is a block diagram showing the structure of a vehicle electrical-load limiting apparatus according to one embodiment of the present invention.

A vehicle electrical-load limiting or restricting apparatus according to one embodiment of the present invention basically comprises an arithmetic device 5 for calculating the amount P of drive restriction of an electrical load in response to a detected signal W output from a load-condition detecting device 2 for detecting the state or condition of an electrical load 1 corresponding to each of various electrical equipment or components mounted on an electric vehicle and a detected signal E output from a residual-capacity detecting device 4 for detecting the amount of residual energy, i.e., residual capacity of an electric source 3 such as a battery for the electric vehicle, and a load control device 6 for controlling the driving of each of the electrical components in accordance with the output (the amount of drive restriction of the electrical load) P calculated by the arithmetic device 5.

As will be described later, the arithmetic device 5 also receives a detected signal output from a use environment sensor 7 used when a standard value of an electrical load is determined by considering use environments or conditions (such as ambient brightness, temperature and moisture on the road, etc. in case of an automobile, for example). As such a sensor, there are known a luminance sensor, a raindrop or moisture sensor, and a temperature sensor.

The vehicle electrical-load limiting apparatus is also provided with a display device 8 activated in response to a load control signal output from the load control device 6 in order to inform the state of the drive restriction of each of the electrical components (electrical loads) to a driver or the like. As the display device 8, there is known a display element such as an LED, which represents which electrical component is restricted.

In various electrical components each serving as an electrical load 1, the priority of the electrical components as to the restriction of the driving of the electrical components is determined in advance in order of importance of the electrical components mounted on the electric vehicle. Information about the priority thus determined is stored in the arithmetic device 5.

The electrical components mounted on the electric vehicle can be divided into four groups, for example in order of their importance as follows:

A Group (unable to restrict)
Hazard, high-mount stop lamp, power brake stop light, tail light, power steering, turn light, position light, motor controller, back light, antilock brake, regenerative energy system, license lamp, air bag, horn, side marker, meter and the like, reverse chime, transmission controller, heater unit, washing liquid, power window, radio, cooling fan, watch, mode motor B Group (performance restriction)
Blower motor, heater coil, condenser fan, air conditioner C Group (load saving)
Headlight (H/L), FR wiper (H/L), rear defroster, fog light D Group (able to restrict)
Interior light, remocon (remote control) mirror, auto antenna, map light, heated mirror, passive belt, courtesy light, power door lock, trunk light, power sheet, key light, sunroof, vanity mirror, illumination audio, glove box light, cigar lighter.

The A group in the above four groups is of a group which cannot be applied as objects subjected to the load restriction in view of safety, law or the like.

The B group belongs to a group which can be applied as objects subjected to the load restriction and can adjust the amount of the drive restriction of each electrical load.

The C group is of a group which can economically avoid the use of a corresponding electrical load when unnecessary in accordance with use environments or conditions (weather, day and night, speed, etc.) of a vehicle as well as with the residual capacity and the state of each of electrical loads. For example, a process for automatically putting out the light that a driver forgot to turn off after a vehicle has passed through a tunnel and an intermittent operation of a wiper at the time the driver waits for a traffic signal are included as objects.

The D group is of a group which can be applied as objects subjected to the load restriction and cannot adjust the amount of the drive restriction of each electrical load. Now, the D group is further divided into two groups, i.e., D①  and D② in the order of a high priority (importance).

A description will now be made of one example illustrative of a load control algorithm executed by a fuzzy inference in the arithmetic device 5.

According to the arrangement shown in FIG. 1, the detected signal W output from the load-condition detecting device 2, the residual capacity E of the electric source 3 output from the residual-capacity detecting device 4, the amount P of the drive restriction of the electrical load, and other values used for arithmetic operations are represented as follows:

Standard value of electrical load: $W_B$ [W]
Present value of electrical load: W [W]
Deviation indicative of difference between values of electrical loads: $e = W_B - W$ [W]
Residual capacity of electric source: E [Wh]
Amount of drive restriction of electrical load: P [W]

Figure 2:
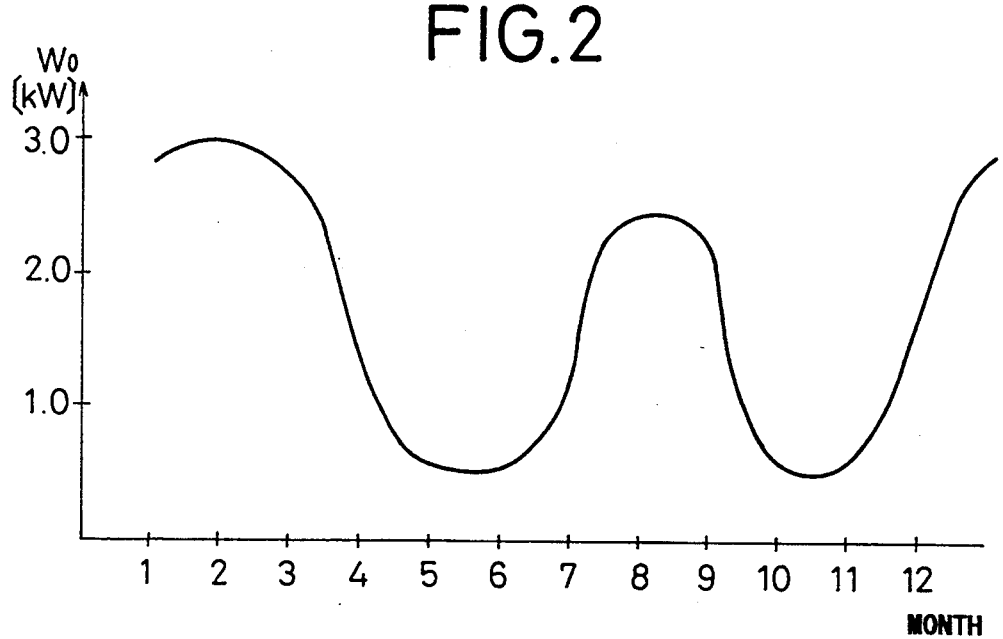
FIG. 2 is an explanatory graph illustrating the average value of normal electrical loads, which is used to set a standard load value by the vehicle electrical-load limiting apparatus.

The standard value $W_B$ of the electrical load may be defined by setting the average value of electrical loads. However, the standard value $W_B$ can also be determined in the following manner. That is, the arithmetic device 5 first determines the use environments in response to the detected signal output from the use environment sensor 7 and then performs an automatic arithmetic operation or computation based on a predetermined algorithm in accordance with to the result of the determination, thereby making it possible to determine the standard value $W_B$. in this case, the standard value $W_B$ can be calculated in accordance with the following equation, for example:

$$W_B = W_0 k_1 W_{AC} + k_2 W_{HL} + k_3 W_{WP} \quad (1)$$

where $W_B$: final standard load value $W_0$: average value of normal electrical loads necessary for vehicle running $W_{AC}$: electrical load of heater/air-conditioner $W_{HL}$: electrical load of headlight $W_{WP}$: wiper driving load $k_1, k_2, k_3$: coefficients of respective electrical loads As $W_0$ referred to above, the annual average value of electrical loads to be used, the average value of electrical loads used when it is fine during the day and the climate is in a calm season, or values [KW] varied with a change in season as shown in FIG. 2 are employed.

Figure 3:
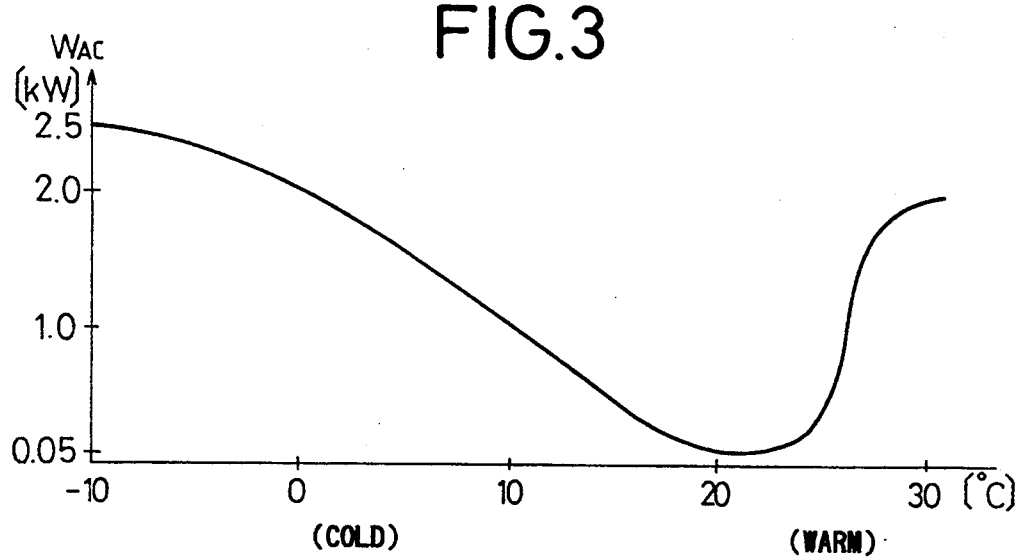
FIG. 3 is an explanatory graph showing exemplary values of electrical loads of a heater and an air-conditioner, which are used to set the standard load value by the vehicle electrical-load limiting apparatus.

As illustrated in FIG. 3, values which vary with temperature, are used as $W_{AC}$. The temperature is detected by a temperature sensor mounted on a vehicle body. Alternatively, cold and warm temperatures may be determined based on an on/off state of an ON/OFF switch of an air-conditioner.

As shown in FIG. 4, values which vary in two stages depending on the brightness and darkness, are used as $W_{RL}$. The state of the brightness and darkness is detected by a luminance sensor attached to the vehicle body. Alternatively, the state of the brightness and darkness may be judged based on an on/off state of an ON/OFF switch of a headlight.

As illustrated in FIG. 5, values which vary in a stepwise manner by the weather, are used as $W_{WP}$. The weather (a change from fine weather to rainy weather) is detected from an output voltage [mV] of a moisture sensor mounted on the vehicle body. Alternatively, the weather may be determined by the output of a wiper drive sensor.

According to the present invention, control rules are defined as given in the next Table 1, for example. That is, the antecedent portion is used to determine at what degree the deviation e indicative of the difference between the values of the electrical loads and the residual capacity E are represented, whereas the consequent portion is used to determine at what degree the amount P of the drive restriction of the electrical load is represented. A plurality of control rules (49 rules in the present embodiment) are formulated in advance.

TABLE 1

| E \ e | NB | NM | NS | ZO | PS | PM | PB |
|---|---|---|---|---|---|---|---|
| NB | (1) NB | (8) NB | (15) NB | (22) NB | (29) NB | (36) NB | (43) NB |
| NM | (2) NB | (9) NM | (16) NM | (23) NM | (30) NM | (37) NM | (44) NM |
| NS | (3) NM | (10) NM | (17) NM | (24) NS | (31) NS | (38) NS | (45) NS |
| ZO | (4) | (11) | (18) | (25) | (32) | (39) | (46) |

TABLE 1-continued

| E \ e | NB | NM | NS | ZO | PS | PM | PB |
|---|---|---|---|---|---|---|---|
|    | NM | NS | ZO | ZO | ZO | ZO | ZO |
| PS | (5) NS | (12) ZO | (19) ZO | (26) ZO | (33) ZO | (40) PS | (47) PS |
| PM | (6) PM | (13) PM | (20) PM | (27) PM | (34) PM | (41) PM | (48) PM |
| PB | (7) PB | (14) PB | (21) PB | (28) PB | (35) PB | (42) PB | (49) PB |

Incidentally, fuzzy labels given in Table 1 are as follows:

PB (Positive Big): large in positive direction

PM (Positive Medium): medium in positive direction

PS (Positive Small): small in positive direction

ZO (Zero): substantially zero

NS (Negative Small): small in negative direction

NM (Negative Medium): medium in negative direction

NB (Negative Big): large in negative direction

Numerals given in parentheses in Table 1 show rules' numbers.

The deviation e indicative of the difference between the values of the electrical loads, the residual capacity E of the electric source and the amount P of the drive restriction are respectively divided into the following fuzzy regions according to the above labels.

TABLE 2

$$e \begin{cases} \text{NB:} & (-d \leq e \leq -b) \text{ load near the maximum load is used} \\ \text{NM:} & (-d \leq e \leq -a) \text{ extremely large load is used} \\ \text{NS:} & (-c \leq e \leq +a) \text{ load larger than standard load is used} \\ \text{ZO:} & (-b \leq e \leq +b) \text{ load near standard load is used} \\ \text{PS:} & (-a \leq e \leq +c) \text{ load smaller than standard load is used} \\ \text{PM:} & (+a \leq e \leq +d) \text{ extremely small load is used} \\ \text{PB:} & (+b \leq e \leq +d) \text{ load is hardly used} \end{cases}$$

TABLE 3

$$E \begin{cases} \text{NB:} & \text{DOD } 100 \text{ to } 75\% \\ \text{NM:} & \text{DOD } 100 \text{ to } 60\% \\ \text{NS:} & \text{DOD } 90 \text{ to } 50\% \\ \text{ZO:} & \text{DOD } 70 \text{ to } 30\% \\ \text{PS:} & \text{DOD } 60 \text{ to } 10\% \\ \text{PM:} & \text{DOD } 50 \text{ to } 0\% \\ \text{PB:} & \text{DOD } 30 \text{ to } 0\% \end{cases}$$

where DOD represents the depth of discharge.

TABLE 4

$$P \begin{cases} \text{NB:} & \text{Groups B + C + D ①② are restricted (B: stop)} \\ \text{NM:} & \text{Groups B + C + D ①② are restricted (B: intermittent action)} \\ \text{NS:} & \text{Groups B + C + D ①② are restricted (B: low mode action)} \\ \text{ZO:} & \text{Groups C + D ①② are restricted} \\ \text{PS:} & \text{Group D ①② are restricted} \\ \text{PM:} & \text{Group D ② is restricted} \\ \text{PB:} & \text{No restrictions} \end{cases}$$

Figure 6:
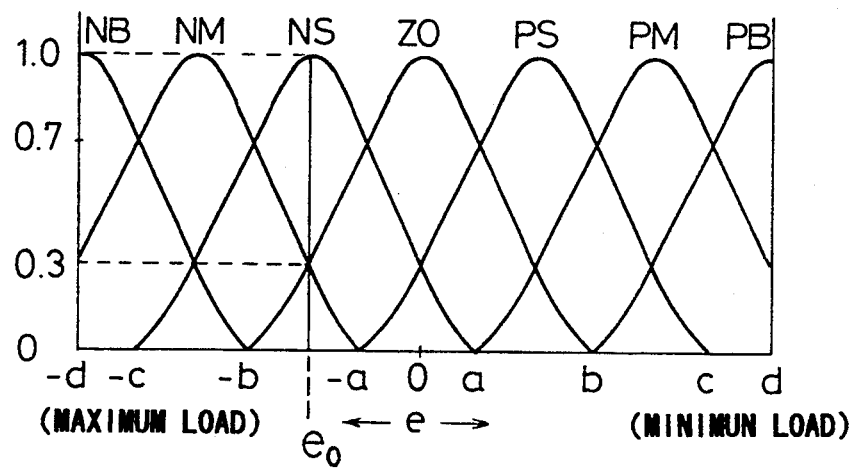
FIG. 6 is a graph showing a membership function of the deviation indicative of the difference between values of electrical loads, which is employed in a fuzzy inference executed by the vehicle electrical-load limiting apparatus.
Figure 7:
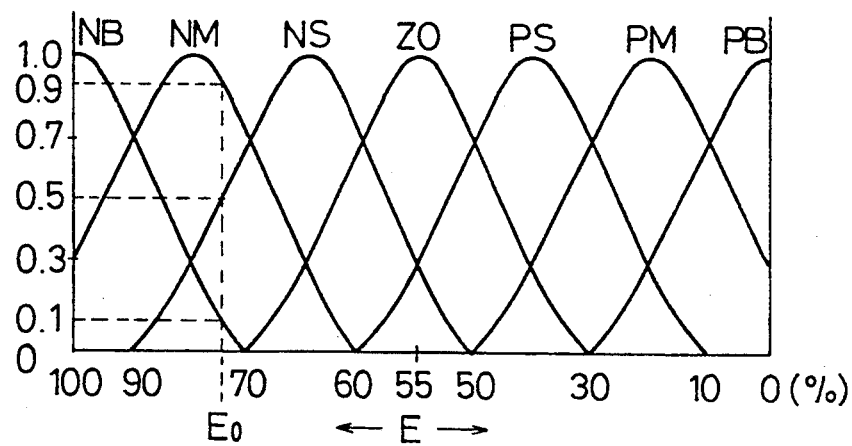
FIG. 7 is a graph showing a membership function of the remaining capacity, which is employed in the fuzzy inference executed by the vehicle electrical-load limiting apparatus.
Figure 8:
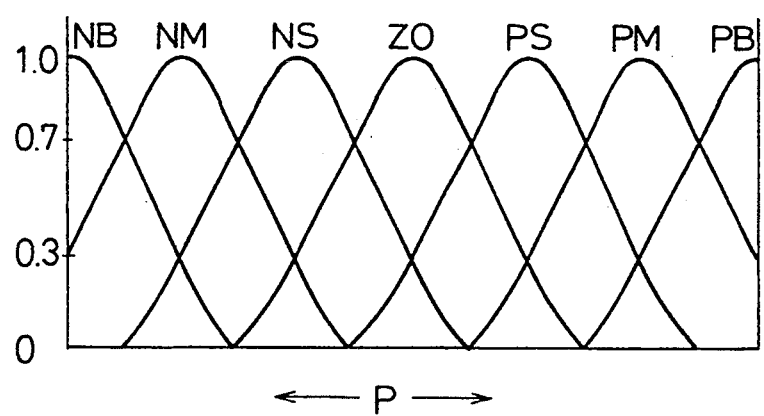
FIG. 8 is a graph showing a membership function of the amount of drive restriction of an electrical load, which is employed in the fuzzy inference executed by the vehicle electrical-load limiting apparatus.
Figure 9A:
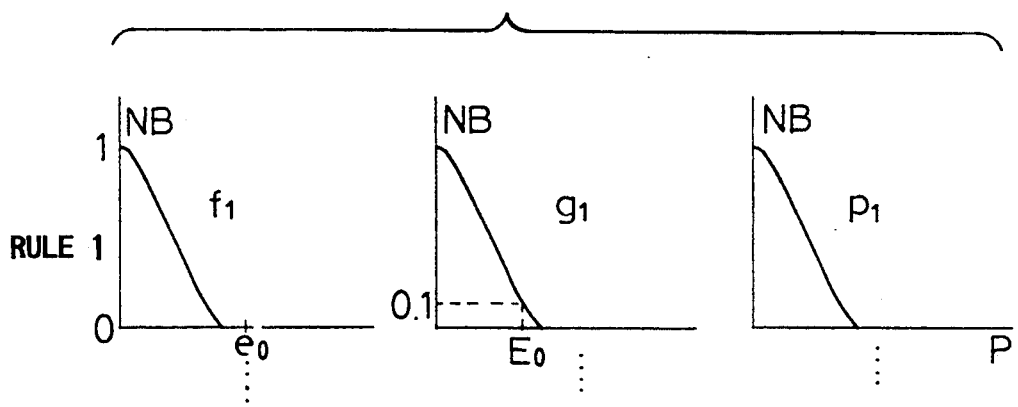
FIGS. 9(a) through 9(f) are graphs for describing the results of the fuzzy inference with respect to respective fuzzy control rules.
Figure 9B:
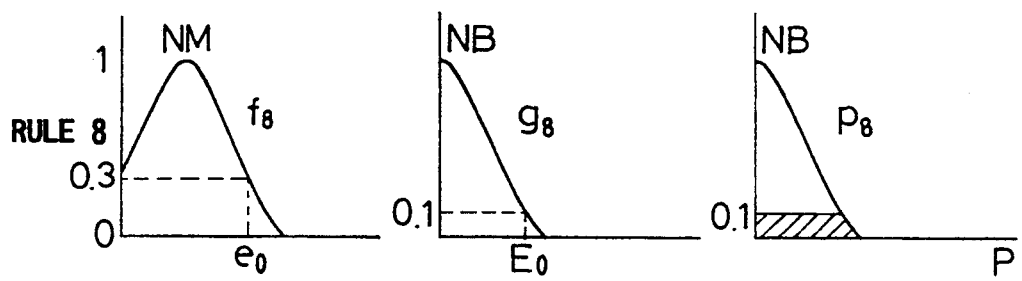
Figure 9C:
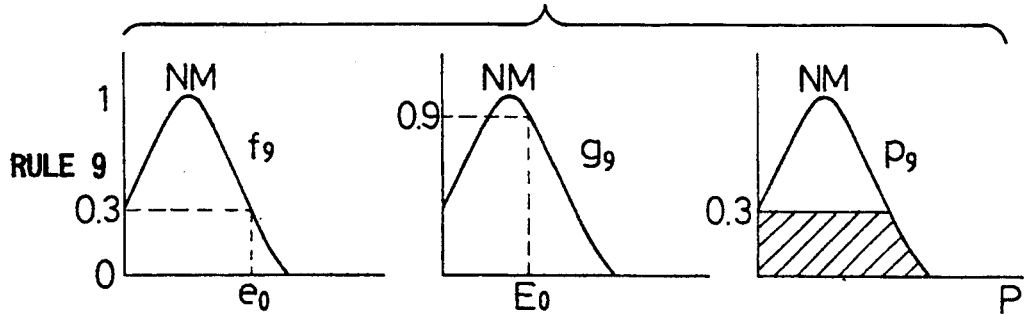
Figure 9D:
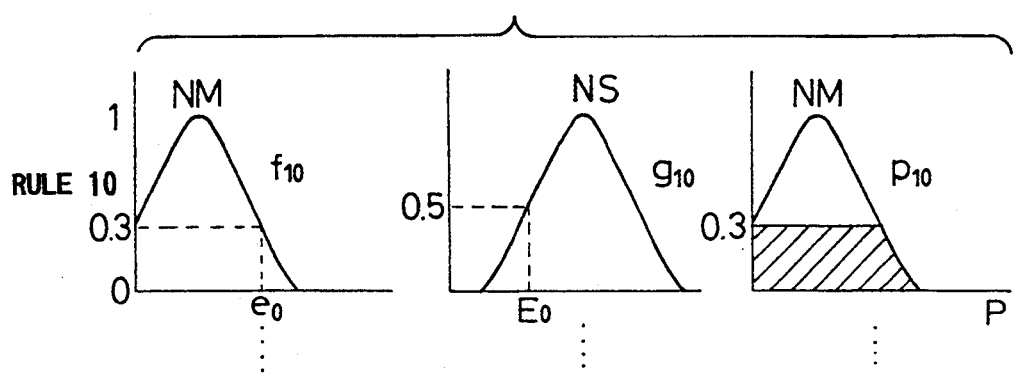
Figure 9E:
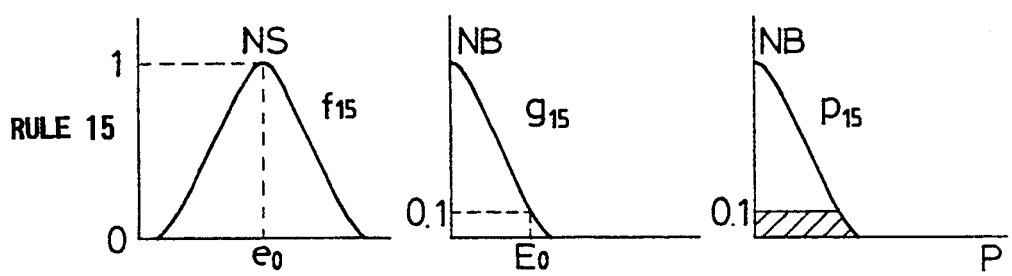
Figure 9F:
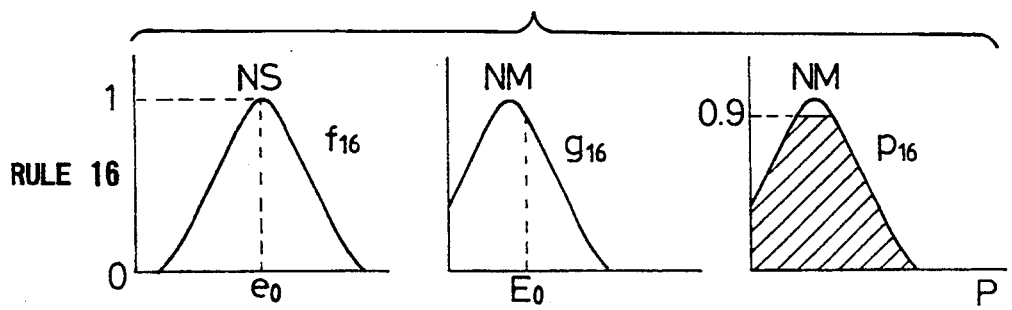

Membership functions corresponding to the deviation e indicative of the difference between the values of the electrical loads, the residual capacity E of the electric source and the amount P of the drive restriction of the electrical load are defined as illustrated in FIGS. 6 through 8, respectively.

Thus, the amount $H_0$ of operation corresponding to the present control state ($e_0$, $E_0$) is obtained by firstly performing a min arithmetic operation on each of a plurality of rules and then performing a composite (max) arithmetic operation on the results of the min arithmetic operation. That is, the operation amount $H_0$ is calculated based on the following equation:

$$H_0 = max\{f_i(e_0) \wedge g_i(E_0) \wedge P_i(P)\} \quad (2)$$

where i=1, 2, 3, ..., 49 (numbers of rules).

Figure 10A:
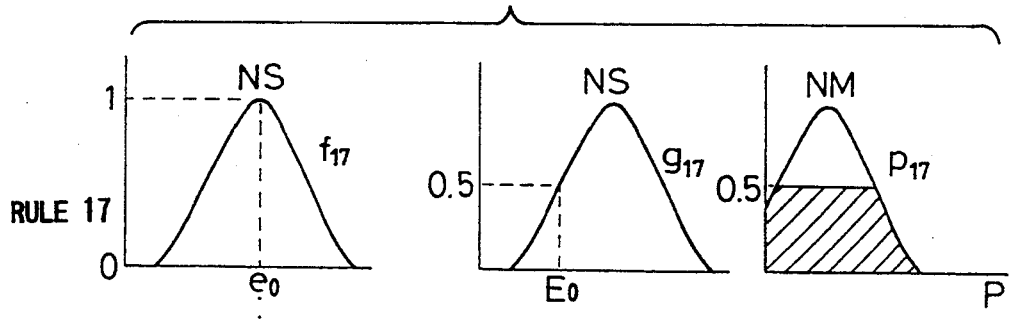
Figure 10B:
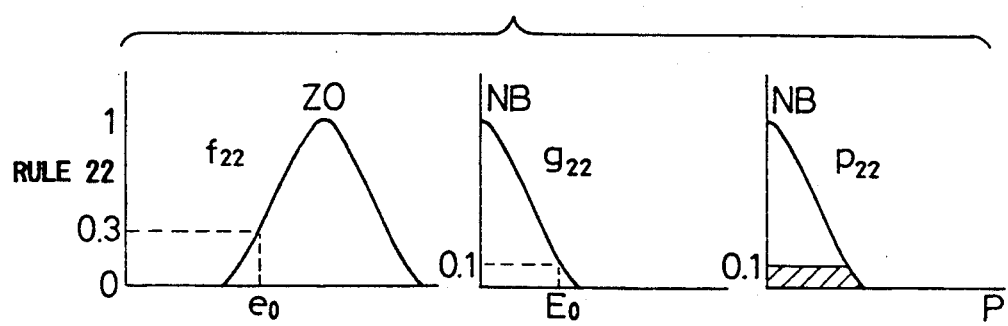
Figure 10C:
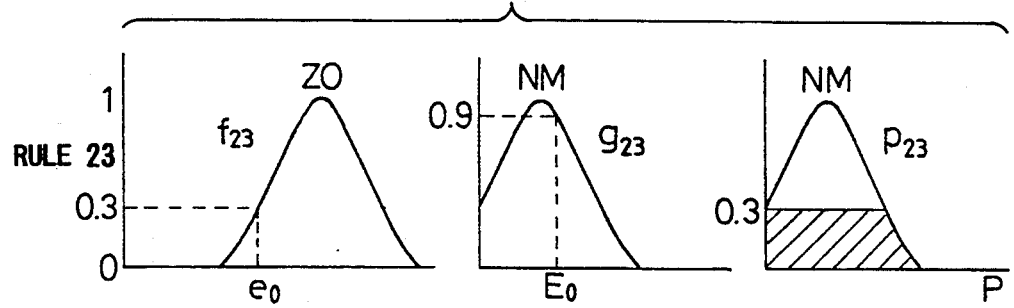

When the deviation e and the residual capacity E are respectively $e_0$ and $E_0$ shown in the drawing, for example, the similarity of factors, i.e., membership values relative to the deviation e are represented as NB=0, NM=0.3, NS=1.0, ZO=0.3, PS=PM=PB=0, respectively. Membership values relative to the residual capacity E are represented as NB=0.1, NM=0.9, NS=0.5, ZO=PS=PM=PB=0, respectively. The amount P of the drive restriction obtained for each rule is represented by an area (fuzzy set) indicated by oblique lines shown in each of FIGS. 9 and 10. $H_0$ calculated from the equation (2) is equivalent to a synthesized or combined fuzzy quantity represented by a membership function as illustrated in FIG. 10(e). Therefore, the center of gravity G is now calculated from the following equation (3) in accordance with a center-of-gravity method so as to determine it as a definitive value $P_0$.

$$P_0 = \frac{\int p H_0(p) dp}{\int H_0(p) dp} \quad (3)$$

The driving of the electrical loads (electric components) classified into the respective groups as described above can be restricted in accordance with the definitive value (the amount of the drive restriction) $P_0$ thus determined.

Figure 11:
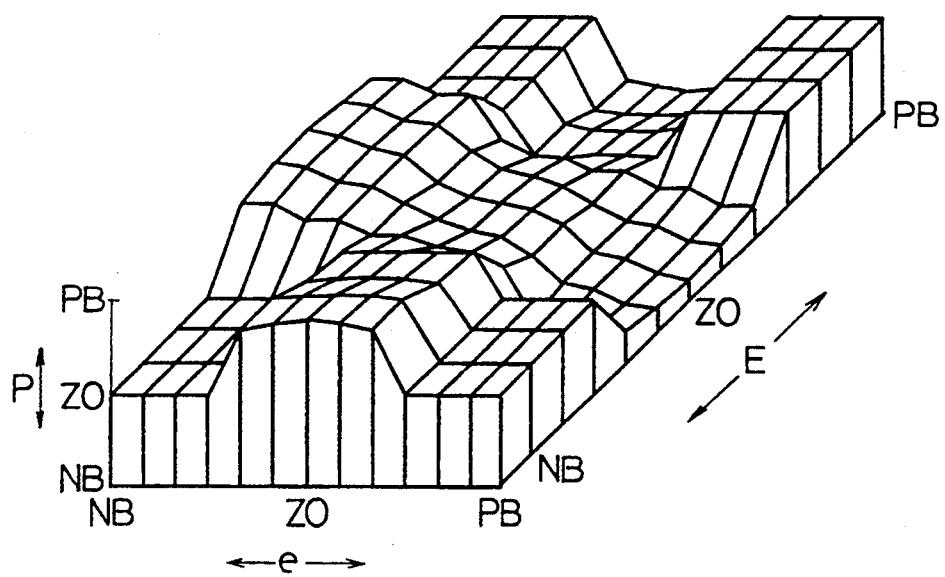
FIG. 11 is a diagram showing an exemplary fuzzy relation of the amount of the drive restriction with respect to the deviation and the remaining capacity in the form of a three-dimensional coordinate table.

In addition, a fuzzy relation of P to the above values e and E can be represented in the form of a three-dimensional coordinate table as shown in FIG. 11, for example. The fuzzy inference can rapidly be carried out by representing the fuzzy relation in the form of such a table and storing information about the table in a computer.

When the driving of each of the electrical loads is limited by a predetermined value, there is a possibility of hunting being produced. However, the amount of the drive restriction of each of the electrical loads is determined by the two variables, i.e., the deviation e and the residual capacity E of the electric source with respect to the standard value $W_B$ of the electrical load as described above in the present invention. Therefore, the hunting is hard to occur. In order to reliably remove the hunting, a dead or neutral zone may be provided.

The above embodiment describes a case in which the vehicle electrical-load limiting apparatus is employed in the electric vehicle. However, the present invention is not necessarily limited to the present embodiment. The apparatus may also be used as an apparatus for controlling electrical loads mounted on vehicles such as a hybrid-type electric automobile and an engine-driven type automobile each of which having an electric source such as a battery mounted thereon.

According to the present invention, as described above, the fuzzy inference is carried out by making use of the membership functions corresponding to both of the deviation indicative of the difference between the standard value set for each electrical load attached to the vehicle and the value of the electrical load when now in use and the residual capacity of the electric source. Thereafter, the amount of the drive restriction of each electrical load is obtained from the result of the fuzzy inference. It is therefore possible to automatically determine to what degree the driving of the electrical loads should be restricted according to the degree of the residual capacity of the electric source.

Further, the standard value of the electrical load can automatically be calculated depending on a present vehicle use environment, and the amount of the drive restriction of each electrical load can be judged based on the two values, i.e., the deviation indicative of the difference between the calculated standard value and the present value, and the residual capacity of the electric source, thereby making it possible to realize a further suitable and fine drive restriction.

Having now fully described the intention, it will be apparent to those skilled in the art that many changes and modifications can be made without departing from the spirit or scope of the invention as set forth herein.

What is claimed is:

1. An apparatus, for deciding priority given over a plurality of electrical loads and restricting the driving of said electrical loads mounted on an electric vehicle in order of importance and determining the amount of drive restriction of each of said electrical loads on the basis of the remaining capacity of an electric source mounted on the electric vehicle, thereby restricting the driving of each of said electrical loads, said apparatus comprising:

arithmetic means for setting membership functions corresponding to both (1) a deviation indicative of the difference between a standard value set for each of said electrical loads and a present value indicative of the state of the present electrical load and (2) the remaining capacity of said electric source and executing a fuzzy inference using said membership functions, thereby determining the amount of the drive restriction of each of said electrical loads from the result of the execution of said fuzzy inference;

wherein said arithmetic means comprises:
  (a) restriction priority setting means for setting said drive restriction priority of said plurality of electrical loads mounted on the vehicle in order of importance;
  (b) restriction priority storing means for storing therein said set drive restriction priority of said plurality of electrical loads;
  (c) electrical load detecting means for detecting one of said plurality of electrical loads;
  (d) standard value arithmetic means for performing an arithmetic operation on a standard value of a desired electrical load based on the present value of said detected one electrical load;
  (e) deviation arithmetic means for calculating the deviation indicative of the difference between the present value of said detected one electrical load and said calculated standard value of said desired electrical load;

(f) residual-capacity detecting means for detecting the remaining capacity of an electric source mounted on the vehicle;

(g) fuzzy inference arithmetic means for reading a membership function of the deviation and the residual capacity, which has previously been stored in membership function storing means on the basis of said calculated deviation and said detected residual capacity and performing an arithmetic operation on a fuzzy inference based on said read membership function;

(h) amount-of-drive-restriction arithmetic means for calculating the amount of the drive restriction of each of said electrical loads from the result of the arithmetic operation on said fuzzy inference; and (i) electrical-load controlling means for reading said drive restriction priority stored in said restriction priority storing means based on the result of the arithmetic operation on said amount of the drive restriction and controlling each of said electrical loads in accordance with said drive restriction priority; and wherein said electrical loads whose drive restriction priority is stored in said restriction priority storing means are divided into a first group unsuitable to the drive restriction of said electrical loads, a second group capable of adjusting the amount of the drive restriction of each of said electrical loads, a third group capable of adjusting the amount of the drive restriction of each of said electrical loads and providing economical use of said electrical loads in accordance with use environments of the vehicle, and a fourth group suitable to the drive restriction of said electrical loads and incapable of adjusting the amount of the drive restriction of each of said electrical loads.

2. An apparatus according to claim 1, wherein said first group includes electrical loads such as a power steering and a running-motor controller or the like, which are indispensable to the running of the vehicle.

3. An apparatus according to claim 1, wherein said second group includes electrical loads such as an air conditioner and a heater coil or the like, which are capable of restricting performance of said electrical loads by reducing electric power to be supplied.

4. An apparatus according to claim 1, wherein said third group includes electrical loads capable of restricting their performance by reducing supply power, and economically avoiding unnecessary operations such as wiper driving at the time of stoppage of the vehicle and control of the turning on of a headlight at a bright location.

5. An apparatus according to claim 1, wherein said fourth group includes electrical loads such as an interior light and a remocon mirror or the like, which are incapable of adjusting the amount of the drive restriction of each of said electrical loads when they are subjected to a use limit.

6. An apparatus according to claim 1, wherein said electrical load detecting means is a detecting circuit for detecting the total dissipated power of various electrical components mounted on the vehicle.

7. An apparatus according to claim 1, wherein said residual-capacity detecting means includes depth-of-discharge detector for detecting the depth of discharge of a vehicle driving battery and an arithmetic circuit for calculating the remaining capacity of the battery based on said detected depth of discharge.

8. An apparatus according to claim 1, wherein said fuzzy inference arithmetic means has a membership function storing circuit for storing therein a membership function of the deviation and the residual capacity which have been set in advance.

9. An apparatus according to claim 1, wherein said fuzzy inference arithmetic means is activated to divide a membership function relative to the residual capacity read from said membership function storing means into a plurality of fuzzy regions in accordance with the depth of the discharge.

10. An apparatus according to claim 1, wherein said amount-of-drive-restriction arithmetic means performs an arithmetic operation on the amount of the drive restriction based on values of the membership functions relative to the deviation and values of the membership functions relative to the residual capacity.

11. An apparatus according to claim 1, wherein said arithmetic means automatically calculates a standard value in accordance with an environmental state to which the vehicle is subjected.

12. An apparatus according to claim 11, wherein an arithmetic operation on said environmental state is performed based on a detected signal output from each of a luminance sensor, a moisture sensor and a temperature sensor.

13. An apparatus according to claim 1, wherein said vehicle is an electric automobile.

14. An apparatus, for deciding priority given over a plurality of electrical loads for restricting the driving of said electrical loads mounted on a vehicle in order of importance and determining the amount of drive restriction of each of said electrical loads on the basis of the remaining capacity of an electric source mounted on the vehicle, thereby restricting the driving of each of said electrical loads, said apparatus comprising:

arithmetic means for setting membership functions corresponding to both the deviation indicative of the difference between a standard value set for each of said electrical loads and the present value indicative of the state of the present electrical load and the remaining capacity of said electric source, and executing a fuzzy inference using said membership functions, thereby determining the amount of the drive restriction of each of said electrical loads from the result of the execution of said fuzzy inference;

said arithmetic means comprising restriction priority setting means for setting said drive restriction priority of said plurality of electrical loads mounted on the vehicle in order of importance, restriction priority storing means for storing therein said set drive restriction priority of said plurality of electrical loads, electrical load detecting means for detecting one of said plurality of electrical loads, standard value arithmetic means for performing an arithmetic operation on a standard value of a desired electrical load based on the present value of said detected one electrical loads, deviation arithmetic means for calculating the deviation indicative of the difference between the present value of said detected one electrical load and said calculated standard value of said desired electrical load, residual-capacity detecting means for detecting the remaining capacity of an electric source mounted on the vehicle, fuzzy inference arithmetic means for reading a membership function of the deviation and the residual capacity, which as previously been stored in membership function storing means on the basis of said calculated deviation and said detected residual capacity and performing an arithmetic operation on a fuzzy inference based on said read membership function, amount-of-drive-restriction arithmetic means for calculating the amount of the drive restriction of each of said electrical loads from the result of the arithmetic operation on said fuzzy inference, and electrical-load controlling means for reading said drive restriction priority stored in said restriction priority storing means based on the result of the arithmetic operation on said amount of the drive restriction and controlling each of said electrical loads in accordance with said drive restriction priority; and wherein said standard value arithmetic means performs an arithmetic operation on a standard value of each electrical load based on the final standard load value, the average value of normal electrical loads necessary for vehicle running and each of coefficients of electrical loads of the heater and the air conditioner, an electrical load of the headlight and an electrical load for driving the wipers.

15. An apparatus according to claim 14, wherein said arithmetic means automatically calculates a standard value in accordance with an environmental state to which the vehicle is subjected.

16. An apparatus according to claim 15, wherein an arithmetic operation on said environmental state is performed based on a detected signal output from each of a luminance sensor, a moisture sensor, and a temperature sensor.

17. An apparatus according to claim 14, wherein said vehicle is an electric automobile.

* * * * *